US009664405B2

(12) United States Patent
Heberer et al.

(10) Patent No.: US 9,664,405 B2
(45) Date of Patent: May 30, 2017

(54) CONTROL SYSTEM FOR ENERGY RECOVERY VENTILATOR (71) Applicant: CARRIER CORPORATION, Farmington, CT (US)

(72) Inventors: Dwight H. Heberer, Brownsburgn, IN (US); Daniel J. Dempsey, Carmel, IN (US)

(73) Assignee: CARRIER CORPORATION, Farmington, CT (US)

( * ) Notice: Subject to any disclaimer, the term of this patent is extended or adjusted under 35 U.S.C. 154(b) by 356 days.

(21) Appl. No.: 14/048,335

(22) Filed: Oct. 8, 2013

(65) Prior Publication Data
US 2014/0138076 A1 May 22, 2014

Related U.S. Application Data (60) Provisional application No. 61/727,614, filed on Nov. 16, 2012.

(51) Int. Cl.
G05D 15/00 (2006.01)
G05D 23/00 (2006.01)
F24F 12/00 (2006.01)
F24F 11/00 (2006.01)

(52) U.S. Cl.
CPC ........ *F24F 12/006* (2013.01); *F24F 11/0015* (2013.01); *F24F 11/0076* (2013.01); *F24F 2011/0013* (2013.01); *F24F 2011/0016* (2013.01); *Y02B 30/563* (2013.01)

(58) Field of Classification Search
CPC .......... F16L 53/001; F17D 3/00; F28D 1/022; F28D 7/082; F28F 27/00; F28F 27/02; F28F 2250/06
See application file for complete search history.

(56) References Cited

U.S. PATENT DOCUMENTS

| 4,952,283 A * | 8/1990 | Besik .................... F24F 3/1411 165/4 |
| 7,150,314 B2 * | 12/2006 | Moffitt .................. F24F 12/001 165/249 |
| 2005/0155363 A1 * | 7/2005 | Shah .................... F24F 11/0008 62/176.6 |
| 2005/0224591 A1 * | 10/2005 | Wolfson ............... F24F 11/0001 236/49.3 |

(Continued)

FOREIGN PATENT DOCUMENTS

| CA | 2769346 A1 * | 8/2012 | ............. F24F 1/022 |
| WO | WO 2013116197 A1 * | 8/2013 | ............ F24F 1/0007 |

OTHER PUBLICATIONS

Carrier, "Thermidistat Control," Installation, Start-Up, and Operating Instructions, pp. 1-12, Aug. 1999, [online], [retrieved on Aug. 21, 2016]. Retrieved from the Internet: <http://dms.hvacpartners.com/docs/1009/Public/02/TSTAT-13SI.pdf>.*

*Primary Examiner* — Ljiljana Ciric
(74) *Attorney, Agent, or Firm* — Cantor Colburn LLP (57) ABSTRACT An energy recovery ventilator control system is operable to be energized by electrical connection to a heating and cooling system including a thermostat/humidistat in fluid communication with each of an intake air duct and an exhaust air duct. The energy recovery ventilator control system is operable to regulate air temperature and humidity within a building using a temperate and humidity control scheme.

6 Claims, 6 Drawing Sheets (56) References Cited

U.S. PATENT DOCUMENTS

| | | | |
|---|---|---|---|
| 2007/0205297 A1* | 9/2007 | Finkam | F24F 11/001 236/1 C |
| 2009/0001179 A1* | 1/2009 | Dempsey | F24F 11/0001 236/49.3 |
| 2009/0133851 A1* | 5/2009 | Caldwell | F24F 12/006 165/54 |
| 2010/0198411 A1* | 8/2010 | Wolfson | G05B 15/02 700/275 |
| 2011/0076933 A1* | 3/2011 | Stenfors | F24F 12/006 454/237 |
| 2013/0116951 A1* | 5/2013 | McKie | F24F 3/1423 702/61 |
| 2013/0225060 A1* | 8/2013 | Heberer | F24F 11/0079 454/256 |
| 2014/0106660 A1* | 4/2014 | Salerno | F24F 11/0079 454/239 |
| 2014/0138076 A1* | 5/2014 | Heberer | F24F 12/006 165/251 |
| 2014/0190670 A1* | 7/2014 | Dempsey | F24F 12/006 165/121 |

\* cited by examiner

CONTROL SYSTEM FOR ENERGY RECOVERY VENTILATOR

CROSS-REFERENCE TO RELATED APPLICATION

This application claims priority to U.S. Provisional Patent Application Ser. No. 61/727,614, filed Nov. 16, 2012, which is incorporated herein by reference in its entirety.

FIELD OF INVENTION

This invention relates generally to heating exchangers and, more particularly, to an energy recovery ventilator ("ERV") that attaches directly to an existing furnace, fan coil or air handler and uses two duct connections for recovering energy from indoor air.

DESCRIPTION OF RELATED ART

An ERV is generally used with a heating or cooling system to exhaust stale air from a stale air space to a fresh air space and bring in fresh air from the fresh air space to the stale air space while exchanging heat or cool energy, thereby reducing heating or cooling requirements. Typically, an ERV includes a heat exchanger contained in a housing for exchanging heat or cool energy. When the ERV is used with a heating or cooling system, an outside air stream from the outdoors and a stale room air stream from the return air duct separately enter the ERV and pass through the heat exchanger. Within the heat exchanger, energy from the stale room air stream is transferred either to or from the outside air stream. The outside air stream then exits the ERV to the return air duct as a fresh air stream. The stale room air stream then exits the ERV to the outdoors as an exhaust room air stream.

BRIEF SUMMARY

According to aspects of the present disclosure, an energy recovery ventilator control system is disclosed that is operable to be energized by electrical connection to a heating and cooling system including a thermostat and humidistat, either discrete or integrated, or also termed thermostat/humidistat in fluid communication with each of an intake air duct and an exhaust air duct. The control system can comprise a humidity sensor operable to detect an outside absolute or relative humidity level; an air temperature sensor, coupled with the humidity sensor, operable to detect an outside air temperature as the outside air enters the intake air duct; a dehumidification control relay or switch operable to be coupled with and powered by the heating and cooling system and coupled with an intake fan motor through an intake fan motor relay or switch contact and an intake damper motor through a first intake damper motor relay or switch contact; and a cold air relay or switch operable to be coupled with and powered by the coupling of the humidity sensor and the air temperature sensor and coupled with an exhaust damper motor through an exhaust damper motor relay or switch contact and the intake damper motor through a second intake damper motor relay or switch contact.

In some aspects, the air temperature sensor coupled with the humidity sensor and comprising a switch that is operable to perform the functions of: disabling current flow to the intake fan motor and the exhaust fan motor and closing the intake damper and the exhaust damper when the air temperature sensor detects that the outside temperature is at or below a predetermined minimum outside air temperature limit or when the outside humidity sensor detects that the outside relative humidity level is at or above a predetermined maximum outside absolute or relative humidity limit; and disabling current flow to the intake fan motor, closing the intake damper and allowing current flow to the exhaust fan motor if the dehumidification control relay or switch is energized.

In some aspects, the intake fan motor relay or switch contacts can be normally opened, the exhaust damper motor relay or switch contacts can be normally opened, the first intake damper motor relay or switch contacts can be normally opened, and the second intake damper motor relay or switch contacts can be normally closed.

In some aspects, if the humidity sensor detects that the outside absolute or relative humidity of at least about 85%, then dehumidification and cold air relay or switch can be operable to disable current flow to the exhaust fan motor and the intake fan motor; close the exhaust damper by disabling current flow to the exhaust damper motor; and close the intake damper by disabling current flow to the intake damper motor.

In some aspects, an energy recovery ventilator control system is disclosed that can be operable to be energized by electrical connection to a heating and cooling system in fluid communication with each of an intake air duct and an exhaust air duct. The control system can comprise an air temperature sensor operable to detect an air temperature as the outside air enters the intake air duct; and a dehumidification control relay or switch operable to be coupled with and powered by the heating and cooling system and coupled with an intake fan motor through an intake fan motor relay or switch contact and an intake damper motor through an intake damper motor relay or switch contact.

In some aspects, the energy recovery ventilator control system can comprise a humidity sensor operable to detect an outside absolute or relative humidity level and coupled with the air temperature sensor and the heating and cooling system.

In some aspects, the intake fan motor relay or switch contacts are normally open (NO) and the intake damper motor relay or switch contacts are normally open (NO).

In some aspects, a method for energy recovery ventilator control that is operable to be energized by electrical connection to a heating and cooling system in fluid communication with each of an intake air duct and an exhaust air duct is disclosed. The method can comprise measuring an outside absolute or relative humidity level by an humidity sensor; measuring an air temperature as the outside air enters the intake air duct by an air temperature sensor that is with the humidity sensor; energizing a dehumidification control relay or switch that is operable to be coupled with and powered by the heating and cooling system and that is operable to be coupled with an intake fan motor through an intake fan motor relay or switch contact and an intake damper motor through a first intake damper motor relay or switch contact if the inside absolute or relative humidity level is measured above a predetermined humidity threshold level; and energizing a cold air relay or switch that is operable to be coupled with and powered by the coupling of the sensor and coupled with the air temperature sensor and operable to be coupled with an exhaust damper motor through an exhaust damper motor relay or switch contact and the intake damper motor through a second intake damper motor relay or switch contact if the air temperature is measured below a predetermined temperature threshold level.

In some aspects, the air temperature sensor is in communication with the humidity sensor and which comprises a switch that is operable to perform the functions of: disabling current flow to the intake fan motor and the exhaust fan motor and closing the intake damper and the exhaust damper when the air temperature sensor detects that the outside temperature is at or below a predetermined minimum outside air temperature limit; and disabling current flow to the intake fan motor, closing the intake damper and allowing current flow to the exhaust fan motor and the exhaust damper motor when the dehumidification control relay or switch is not energized.

In some aspects, the intake fan motor relay or switch contacts are normally opened, the exhaust damper motor relay or switch contacts are normally opened, the first intake damper motor relay or switch contacts are normally opened, and the second intake damper motor relay or switch contacts are normally closed.

In some aspects, if the humidity sensor detects that the outside absolute or relative humidity of at least about 85%, then it is operable to disable current flow to the exhaust fan motor and the intake fan motor; close the exhaust damper by enabling current flow to the exhaust damper motor; and close the intake damper by enabling current flow to the intake damper motor.

In some aspects, a method for controlling an ERV when powered from a furnace and the ERV running is disclosed. The method can comprise measuring an outside humidity amount by an outside humidity sensor at a first time; comparing the measured outside humidity to a predetermined outside humidity threshold limit; measuring the outside humidity amount at a subsequent time after the first time If the measured outside humidity is not above the predetermined outside humidity threshold limit; and providing a first control signal to shut off an intake fan motor and an exhaust fan motor of the ERV and providing a second control signal to energize a cold air relay or switch Rc to close an exhaust damper and an intake damper If the measured outside humidity is above the predetermined outside humidity threshold limit.

In some aspects, the first control signal and the second control signal are the same.

In some aspects, the method can include measuring an outside temperature by an outside temperature sensor at the first time; comparing the measured outside temperature to a predetermined outside temperature limit; measuring the outside temperature at the subsequent time after the first time If the measured outside temperature is not above the predetermined outside temperature threshold limit; and providing a third control signal to shut off the intake fan motor and the exhaust fan motor of the ERV and providing a fourth control signal to energize the cold air relay or switch Rc to close the exhaust damper and the intake damper If the measured outside temperature is below the predetermined outside temperature threshold limit.

In some aspects, the third control signal and the fourth control signal are the same.

In some aspects, the method can include measuring an inside humidity amount by an inside humidity sensor at the first time; comparing the measured inside humidity to a predetermined inside humidity threshold limit; measuring the inside humidity amount at the subsequent time after the first time If the measured inside humidity is not above the predetermined inside humidity threshold limit; and providing a fifth control signal to de-energize relay or switch Rd to shut off the intake fan motor and close the intake damper If the measured inside humidity is above the predetermined inside humidity threshold limit.

In some aspects, an energy recovery ventilator (ERV) is disclosed that can comprise an on/off switch that is operable to be coupled to and provided power from an electronic air cleaner terminal of an air handler control, or any power connection that is energized when the air handler fan is on; an exhaust fan motor operable to exhaust air from within a structure through an exhaust air duct; and an intake fan motor operable to provide air to the structure from outside through an intake air duct.

In some aspects, the ERV can be operable to receive a signal from an indoor air temperature sensor that operable to detect indoor air temperature and provide a control signal to any, or combinations of, the exhaust fan motor or the intake fan motor if a predetermined indoor is detected. For example, the indoor air temperature sensor can be included within or part of a thermostat or thermostat/humidistat that can be positionable within the structure, such as on a wall, to measure or detect the indoor air temperature and provide a signal representing the indoor air temperature to the ERV. For example, the ERV can be operable to be powered whenever the "fan" switch on the thermostat is set on the ON position, because this energizes the blower in the air handler and provides power to the EAC terminals.

In some aspects, the ERV can comprise a dehumidification control relay or switch operable to provide humidity control to the structure by being operable to receive a dehumidification control signal from the air handler control board or an indoor wall thermostat/humidistat to control operation any, or combinations of, the exhaust fan motor or the intake fan motor.

In some aspects, the ERV can comprise an outside low temperature switch operable to be in electrical communication with the air handler control board and operable to be triggered when an outside temperature reaches a predetermined low outside temperature threshold.

In some aspects, if the predetermined low outside temperature threshold is reached, the outside low temperature switch can be operable to be triggered to provide a disruption in power provided to any, or combinations of, the exhaust fan motor or the intake fan motor.

In some aspects, the ERV can comprise an outside humidity sensor operable to be in electrical communication with the air handler control board and operable to be triggered when an outside humidity reaches a predetermined high outside humidity threshold.

In some aspects, if the predetermined high outside humidity threshold is reached, the outside humidity sensor can be operable to be triggered to provide a disruption in power to the intake fan motor to reduce an amount of outside air from entering the structure.

In some aspects, the ERV can comprise an outside high temperature switch operable to be in electrical communication with the air handler control board and operable to be triggered when an outside temperature reaches a predetermined high outside temperature threshold.

In some aspects, if the predetermined high outside temperature threshold is reached, the outside high temperature switch can be operable to be triggered to provide a disruption in power provided to the intake fan motor.

In some aspects, the ERV can comprise an intake air damper operable to be positionable within the intake air duct and operable to be opened, closed, or both opened and closed by the dehumidification control relay or switch; and an exhaust air damper operable to be positionable within the exhaust air duct and operable to be opened, closed, or both opened and closed by the dehumidification control relay or switch.

In some aspects, the ERV can comprise an intake air damper motor operable to control operation of the intake air damper; and an exhaust air damper motor operable to control operation of exhaust air damper.

In some aspects, any, or combinations of, the intake air damper and the exhaust air damper can be unpowered, i.e., a flop damper, or powered by a motor. When in an unpowered implementation, any, or combinations of, the intake air damper and the exhaust air damper can be positionable in an open or closed mode by air pressure within the respective intake or exhaust duct. Air pressure can also be used to maintain or change the mode of the air damper.

In some aspects, the ERV can include or connected to a high outdoor temperature sensor that can be operable to be triggered if a predetermined high outdoor temperature, for example, 100° F., is reached. When triggered, the high outdoor temperature sensor can be operable to provide a signal to shut down the ventilation completely, and not just the intake fan motor. The signal or another signal provided by the high outdoor temperature sensor can also be operable to close the dampers, for example, both the intake and exhaust dampers.

BRIEF DESCRIPTION OF THE SEVERAL VIEWS OF THE DRAWINGS

Referring now to the drawings wherein like elements are numbered alike in the FIGURES.

DETAILED DESCRIPTION

Energy Recovery Ventilators (ERVs) typically require low voltage wall controls and most contain electronic circuit board controls internally for purposes of temperature monitoring, control logic and ventilation override control monitoring. In accordance with aspects of the present disclosure, control schemes are disclosed that are operable to accomplish required ventilation while aiding home humidity control while having no need for a separate low voltage wall control or internal electronic control. The control schemes can save both the cost of the controls as well as the field wiring labor needed for installation since low voltage control hookup is directly connected to a furnace electronic circuit board.

As discussed further below, the control schemes can be operable to accomplish required ventilation by power hookup to the furnace electronic control board E.A.C. (electronic air cleaner) terminals and to ventilate whenever the furnace blower is running, thereby exhausting stale air and distributing fresh air throughout the home. In one implementation, a 115 VAC ERV control scheme is disclosed where the ERV control can include an outside intake air temperature switch (set to avoid defrost or to correlate to temperature where stack effect takes over) that shuts the fans off and closes both dampers when a low temperature limit is reached. To aid in home humidity control, it also reacts to a call for dehumidification by the thermostat/humidistat by shutting the outside air intake fan off and closes the damper, resulting in exhaust only operation. In another implementation, an ERV control scheme is disclosed that can include a high outdoor humidity limit scheme that can shut the ERV fans off (and close dampers) in the event the outdoor absolute or relative humidity is at an uncomfortable level, such as over 85 or 90%. In another implementation, 24 VAC damper version is disclosed. In implementations, the ERV control system can be operable to shut off at a high outdoor humidity and/or excessively low outdoor humidity.

In general, the disclosed control system provides a cost-effective means for controlling comfort in low energy homes that require energy efficient ventilation by preventing much of the outdoor humidity from entering the home because the incoming humidity is transferred to the outgoing stale air stream. Also, during peak outdoor humidity periods, particularly those that occur during mild humid weather when the air conditioning is not operating, the impact on indoor humidity can be minimized by shutting the ERV OFF and closing the dampers. This is a significant concern to the users of ERV's in humid climates (Georgia, Carolinas, etc). Since the periods of high outdoor humidity are only about 10% of the year in many climates, the ventilation flowrate can be increased by 10% to compensate for the hours the ventilation system would be forced OFF. And, whenever indoor humidity is high, the system can be operable in an "exhaust only mode" to remove indoor air moisture without that moisture recirculating back to the indoors through the ERV core by infiltrating outdoor air into the home rather than bringing through the ERV. Additionally, the system can operate in this "exhaust only mode" by increasing the speed of the exhaust fan for more effective indoor humidity removal. Again, the trapping of indoor humidity in a home by the ERV is a significant concern to those in humid markets. The integration of this control function with the furnace/fan coil control is an improvement over conventional systems.

In general, an energy recovery ventilator ("ERV") for use with a heating or cooling system includes a generally rectangular housing that may be directly attached to an existing furnace/fan coil in the system. The ERV includes a fresh air intake duct and an exhaust air duct. An outside air stream can enter the ERV through the fresh air intake duct while stale conditioned air from an interior conditioned air space can be exhausted through the exhaust air duct. The ERV can include a heat exchange device for recovering energy from the stale conditioned air prior to exhausting the stale conditioned air to an outside air space. The ERV can be electrically wired directly, via a wire line, to a power supply in the heating and cooling system in order to energize the ERV and eliminate providing a standalone power supply. The ERV can be connected to a furnace/fan coil controller in the heating and cooling system for controlling the operation of the ERV without requiring an additional dedicated controller for ERV control and operation.

Figure 1:
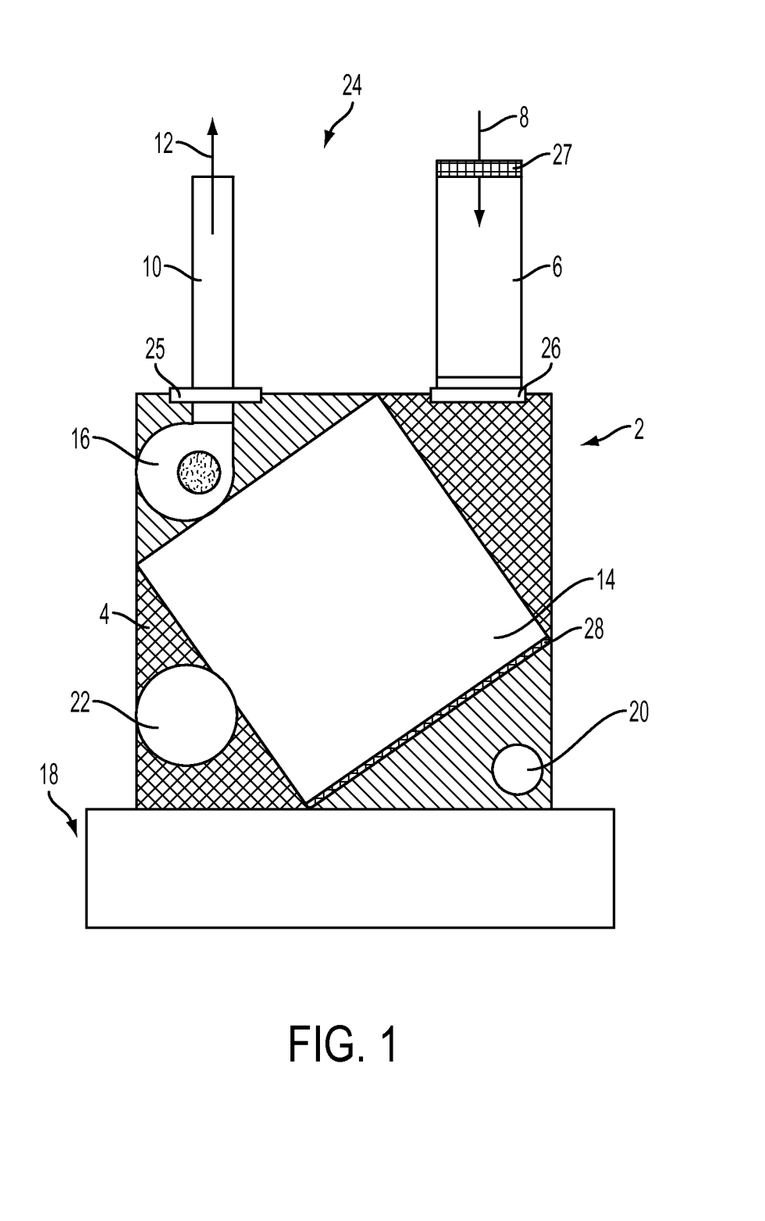
FIG. 1 shows an example of an energy recovery ventilator ("ERV") according to an embodiment of the disclosure.

FIG. 1 shows an example ERV 2 that can be used in connection with a heating or cooling system 18 for circulating fresh air from the outdoors while recovering energy from stale conditioned air. ERV 2 can include a generally rectangular housing 4 fitted with a fresh air intake duct 6 and an exhaust air duct 10. Fresh air intake duct 6 and exhaust air duct 10 can be coupled to selectively movable dampers 25, 26, respectively. Dampers 25, 26 can be selectively controllable by a furnace/fan coil controller, discussed below, in response to signals such as, for example, signals indicative of temperature or humidity that are received from sensors, discussed below, inside and/or outside ERV 2. Dampers 25, 26 can be a valve or plate that stops or regulates the flow of air entering or exiting ERV 2 through the respective ducts 6, 10. ERV 2 can also include a heat exchange device 14 for recovering energy from stale conditioned air. The stale conditioned air is received through return port 20, which is in fluid communication with an air return duct coupled to heating or cooling system 18. Fan 16 can be coupled to heat exchange device 14 in order to induce air movement through heat exchange device 14 as well as induce to a positive air pressure in the furnace/fan coil of heating or cooling system 18. Filter element 27 can be coupled to duct connection 6 in order to filter out any dust, debris, pollutants, or the like from outside air stream 8. Filter element 28 can be coupled to return port 20 to filter exhaust air stream 12 that is received from a return air duct that is in fluid communication with an interior conditioned air space.

In operation, outside air stream 8 from, for example, outdoor air space 24 can enter ERV 2 through duct 6 while stale conditioned air from an interior conditioned air space is received by ERV 2 and exhausted as an exhaust air stream 12 through exhaust air duct 10. Dampers 25, 26 can control the air flow rate entering or exiting ERV 2 or, alternatively, dampers 25, 26 can be closed to shut off airflow through ERV 2. Outside air stream 8 can circulate through heat exchange device 14 where energy exchange can take place within heat exchange device 14. The extracted energy can be transferred to outside air stream 8 and it can enter heating and cooling system 18 as a fresh air stream through supply port 22.

ERV 2 can be electrically wired directly, via, for example, a two-wire line, to heating and cooling system 18 in order to energize ERV 2. The direct wiring can eliminate a need for providing an additional energizing power supply for energizing electrical components of ERV 2. ERV 2 may be selectively and electrically coupled to a controller, discussed below, located in, for example, an electronics circuit board of heating and cooling system 18. The controller can control operation of ERV 2 while also eliminating a need for an additional controller, thereby simplifying the installation as well as reducing the costs associated with installation. In an example, the controller may operate ERV 2 while the furnace/fan coil air circulation blower is ON in order to provide a desired ventilation rate and humidity control through heating and cooling system 18. In another example, the controller may operate ERV 2 for a portion of each hour based on the desired ventilation rate and humidity control the air flow capacity of ERV 2. In an embodiment, the controller can include a microprocessor preprogrammed with software programs that is stored in nonvolatile memory for executing algorithms to provide ERV 2 with a variety of operation modes and control sequences.

Figure 2:
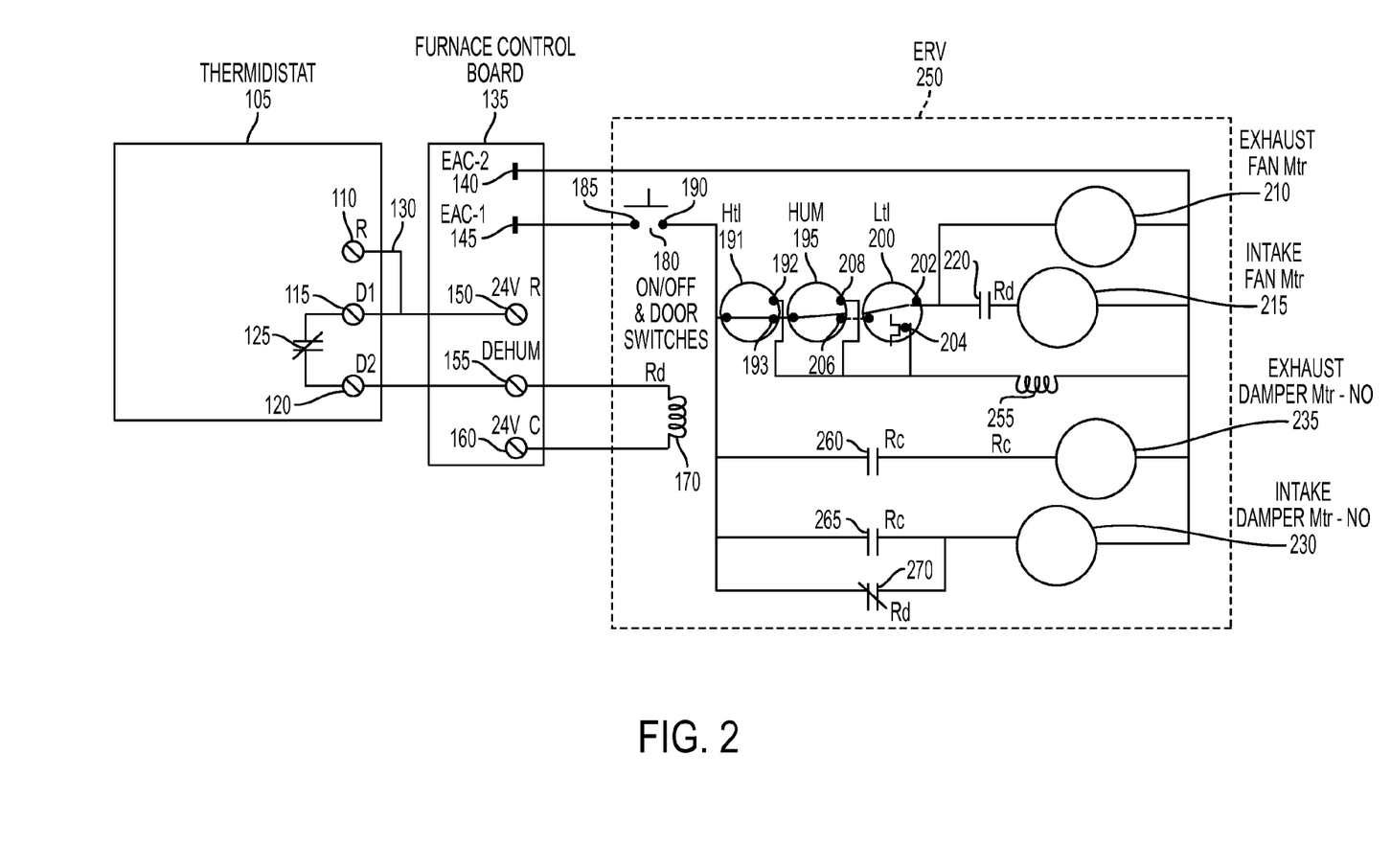
FIG. 2 shows an example of an implementation of a ERV control scheme in accordance with aspects of the present disclosure.

FIG. 2 shows an example of an implementation of an ERV control scheme in accordance with aspects of the present disclosure. Indoor temperature and humidity control 105 can include a sensor, for example, a thermostat/humidistat, which is a combination thermostat and humidistat, can be located inside the conditioned space and can be mounted to a wall inside the home like a normal thermostat. In implementations, indoor temperature and humidity control 105, as wired to the ERV control system, can be programmable and operable to shut the ERV outside air motor and damper (both discussed below) whenever a call for indoor dehumidification is received and/or indoor humidity exceeds a predetermined limit by way of a signal to a heating and cooling system, such as a furnace with an indoor Furnace Control Board 135 (discussed below) that also controls relay or switch 170 in Energy Recovery Ventilator (ERV) 165, 250, 280 (each discussed below) that provides control signals to exhaust fan 210 (discussed below) to remain on and exhaust damper 235 (discussed below) to remain open. This is done so that the moisture in high humidity indoor air is not transferred to the incoming fresh air stream through the ERV energy exchange. Indoor temperature and humidity control 105 can comprise connections R 110, D1 115, and D2 120. Connectors D1 115 and D2 120 can be connected together by a relay, a switch, a microswitch, or contact 125 that is normally closed in operation. Connectors R 110 and D1 115 can be connected together by connector 130.

Furnace Control Board 135 can comprise connections EAC (Electronic Air Cleaner)-2 140, EAC-1 145, 24V R 150, dehumidification connector 155, and 24V C 160. Furnace Control Board 135 can be connected with Indoor temperature and humidity control 105 by connecting connector 24V R 150 with connector D1 115 and by connecting dehumidification connector 155 with connector D2 120. Furnace Control Board 135 can be connected to ERV 165, 250, 280 through dehumidification connector 155 and 24 V C 160 on Furnace Control Board 135 that can be connected to dehumidification control relay or dehumidification control switch 170 on ERV 165, 250, 280. For example, dehumidification control relay or switch 170 can be implemented as a Double Pole Single Throw (DPST) relay or switch. Other suitable conventional relays or switches can also be used.

In one implementation, ERV 250 can operate with 115 VAC provided by Furnace Control Board 135 and can comprise on/off switch in the form of door switch 180, outdoor high temperature thermostat switch 191, outdoor humidistat 195, and outdoor low temperature thermostat switch 200, exhaust fan motor 210, intake fan motor 215, dehumidification control relay or switch 170.

Outdoor high temperature thermostat switch 191 can be arranged as a sensor that is operable to detect or sense outside air temperature and respond, relative to a preset high outdoor temperature setpoint, by activating a switch that has contacts 192 and 193. Outside high temperature thermostat switch 191 can be arranged within ERV 250 such that air temperature of the incoming air from the outside can be measured. The switch can be in either of two states depending on which contact 192 or 193 is active. When outdoor air temperature is above a preset outdoor temperature level, switch is making contact with 193, which then provides an electrical pathway to energize cold air relay or cold air switch 255. When outdoor air temperature is below the preset outdoor temperature level, switch is making contact with 192. In implementations, high temperature thermostat switch 191, outdoor humidistat 195 and outdoor low temperature thermostat switch 200 can be arranged in series.

Outdoor humidistat 195 can be arranged as a sensor that is operable to detect or sense outside absolute or relative humidity and respond, relative to a preset outdoor humidity setpoint, by activating a switch that has contacts 206 and 208. Outdoor humidistat 195 can be arranged within ERV 250 such that the absolute or relative humidity of the incoming air from the outside can be measured. The switch can be in either of two states depending on which contact 206 or 208 is active. When outdoor absolute or relative humidity is above a preset high humidity level, switch is making contact with 208, which then provides an electrical pathway to energize cold air relay or switch 255. When outdoor absolute or relative humidity is below the preset humidity level, switch is making contact with 206, which can provide a electrical pathway to outdoor low temperature thermostat switch 200.

Outdoor low temperature thermostat switch 200 can be arranged as a sensor that is operable to detect or sense outside air temperature and respond, relative to a preset low outdoor temperature setpoint, by activating a switch that has contacts 202 and 204. Outside low temperature thermostat switch 200 can be arranged within ERV 250 such that air temperature of the incoming air from the outside can be measured. The switch can be in either of two states depending on which contact 202 or 204 is active. When outdoor air temperature is below a preset outdoor temperature level, switch is making contact with 204, which then provides an electrical pathway to energize cold air relay or switch 255. When outdoor air temperature is above the preset outdoor temperature level, switch is making contact with 202. In implementations, outdoor humidistat 195 and outdoor low temperature thermostat switch 200 can be arranged in series when contact 206 of outdoor humidistat 195 is closed, which opens contact 208.

Contact 185 of door switch 180 can be connected to contact EAC-1 145 of Furnace Control Board 135. Dehumidification control relay or switch 170 can be, for example, but not limited to, a double pole single throw-type relay or switch and can be connected to intake fan motor relay or switch contacts 220 and intake damper motor relay or switch contacts 270. For example, when an instruction for dehumidification is received at Furnace Control Board 135 from indoor temperature and humidity control 105, dehumidification control relay or switch 170 becomes de-energized, which opens normally open intake fan motor relay contacts or switch 220 and closes normally closed intake damper motor relay or switch contacts 270.

Contact 190 of door switch 180 can be connected to or with outdoor high temperature thermostat switch 191, outdoor humidistat 195, and outdoor low temperature thermostat switch 200. For example, outdoor low temperature thermostat switch 200 can be a KLIXON 3NT thermostat, which is an automatic reset thermostat and sold by Sensata Technologies in Brazil. Other suitable conventional thermostats can also be used.

When outdoor temperature reaches the preset high outdoor temperature level setpoint, the switch of outdoor high temperature thermostat 191 is triggered making electrical contact with contact 193, which then energizes cold air relay Rc or switch 255. When outdoor absolute or relative humidity reaches the preset outdoor humidity level setpoint, the switch of outdoor humidistat 195 is triggered making electrical contact with contact 208, which then energizes cold air relay Rc or switch 255. Similarly, when outdoor temperature reaches the preset low outdoor temperature level setpoint, the switch of outdoor low temperature thermostat switch 200 is triggered making electrical contact with contact 204, which then energizes cold air relay Rc or switch 255. When cold air relay Rc or switch 255 is energized, normally opened cold air relay contacts Rc or switch 260 in electrical communication with exhaust damper motor 235 close and normally opened cold air relay contacts Rc or switch 265 in electrical communication with intake damper motor 230 close.

By closing the intake and exhaust dampers when outdoor air temperatures are low and/or outdoor absolute or relative humidity levels are high (below or above the respective setpoints), the conditioned indoor air space can be maintained in a comfortable state since uncomfortable air is prevented or reduced from flowing into the indoor air space.

In implementations, outdoor low temperature thermostat switch 200 can be operable to turn both exhaust fan motor 210 and intake fan motor 215 of ERV off, and close both exhaust damper 235 and intake damper 230 if the outdoor air temperature is above or below a predetermined limit or setpoint to assist in the prevention of frost buildup on the ERV core, as well as reduce ventilation airflow during periods when house infiltration rate is high (higher or lower outdoor air temperature). In implementations, humidistat 195 can include an integral switch and can function in a similar manner to that of outdoor low temperature thermostat switch 200 to turn both ERV fan motors off, and close dampers, if the outdoor air humidity (either relative or absolute) is above or below a predetermined limit.

In implementations, outdoor low temperature thermostat switch 200 can include an integral switch that can operate as a low temperature limit cutoff that deactives the switch if the temperature goes below a predetermined set point temperature. Outdoor low temperature thermostat switch 200 can be operable to detect or sense the outside air temperature as the air enters an intake duct or can also be sensed at the end of the insulated air duct, ("as it exits the duct"), or as the air enters the ERV. Outdoor low temperature thermostat switch 200 can include contacts 202 and 204. When low temperature thermostat switch 200 makes contact with contact 202, power is provided to exhaust fan motor 210, intake fan motor relay or switch contact 220, which are normally opened, which is then connected to or coupled with intake fan motor 215. When outdoor low temperature thermostat switch 200 makes contact with contact 204, power is provided to relay coil (Rc) or switch 255, which in turn provides power to exhaust damper motor 235, relay contacts (Rc) or switch 260, which are normally opened, intake damper motor 230, which is normally opened, relay contacts (Rc) or switch 265, which are normally opened, and relay contacts (Rd) or switch 270, which are normally closed.

In implementations, exhaust damper and intake damper can be non-powered and can operate as a "flop" damper that relies upon air pressure or gravity to open or close the dampers.

In normal power up and operation, door switch 180 and power switch (not shown) are closed and on. Outdoor humidistat 195 is closed (outdoor absolute or relative humidity is not above the preset outdoor absolute or relative humidity setpoint and switch is making electrical contact with contact 206), low temperature limit on outdoor low temperature thermostat switch 200 is closed (outdoor air temperature is not below the preset outdoor temperature setpoint and switch is making electrical contact with contact 202), dehumidification control relay Rd or switch 170 is energized, cold air relay Rc or switch 255 is not energized, normally open intake damper motor 230 is open and normally closed Rd contacts 270 are open, normally open exhaust damper motor 235 is open and normally open Rc contacts 260 and 265 are open, intake fan motor 215 is on and normally open Rd contacts 220 are closed, and exhaust fan motor 210 is on.

In cold outside air conditions, door switch 180 and power switch (not shown) are closed and on. Outdoor humidistat 195 is closed, low temperature limit on outdoor low temperature thermostat switch 200 is open (outdoor air temperature is at or below the preset outdoor temperature setpoint and switch is making electrical contact with contact 204) and energizing Rc relay or switch 255, dehumidification control relay Rd or switch 170 is energized, cold air relay Rc or switch 255 is energized, normally open intake damper motor 230 is closed and normally open Rc contacts 265 are closed, normally open exhaust damper motor 235 is closed and normally open Rc contacts 260 and 265 are closed, intake fan motor 215 is off and normally open Rd contacts 220 are closed, and exhaust fan motor 210 is off and normally open Rd contacts 220 are closed, and low temperature limit on outdoor low temperature thermostat switch 200 is open.

In high indoor humidity conditions, door switch 180 and power switch (not shown) are closed and on. Outdoor humidistat 195 is closed, low temperature limit on outdoor low temperature thermostat switch 200 is closed, dehumidification control relay Rd or switch 170 is not energized, cold air relay Rc or switch 255 is not energized, normally open intake damper motor 230 is closed and normally closed Rd contacts 270 are closed, normally open exhaust damper motor 235 is opened and normally open Rc contacts 260 and 265 are open, intake fan motor 215 is off and normally open Rd contacts 220 are open, and exhaust fan motor 210 is on.

In high outdoor humidity conditions, door switch 180 and power switch (not shown) are closed and on. Outdoor humidistat 195 is open and energizing Rc relay or switch 255, low temperature limit on outdoor low temperature thermostat switch 200 is closed, dehumidification control relay Rd or switch 170 is energized, or is de-energized when indoor humidity is above the preset humidity setpoint, as it operates independent from the outdoor humidistat 195, cold air relay Rc or switch 255 is energized, normally open intake damper motor 230 is closed and normally open Rc contacts 260, 265 are closed, normally open exhaust damper motor 235 is closed and normally open Rc relay contacts or switch 260 and 265 are closed, intake fan motor 215 is off, and exhaust fan motor 210 is off.

Figure 3:
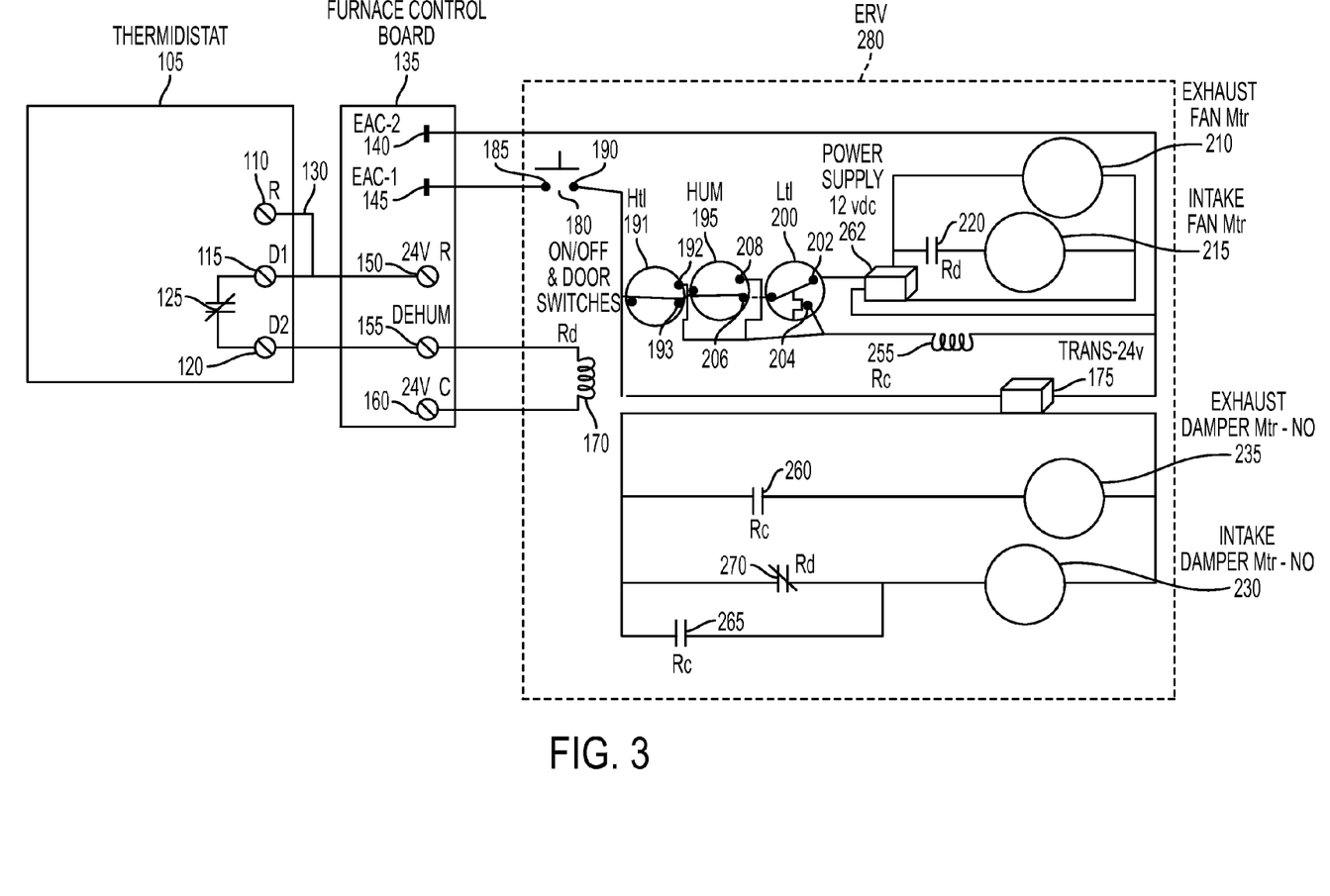
FIG. 3 shows another example of an implementation of a ERV control scheme in accordance with aspects of the present disclosure.

FIG. 3 shows another example implementation of an ERV that can use a 12 VDC motor and 24 VAC normally open damper. ERV 280 can comprise similar components as those described above in relation to FIG. 2 including door switch 180, outdoor humidistat 195, and low temperature thermostat switch 200, fans (including motors), and dampers. In particular, ERV 280 can also include exhaust fan motor 210, intake fan motor 215, normally opened intake fan motor relay contacts Rd or switch 220, dehumidification control relay or switch 170, 12 vdc power supply 262, 24 v transformer 175, cold air relay coil Rc or switch 255, normally opened exhaust damper motor 235, normally opened exhaust damper motor relay contacts Rc or switch 260, normally opened intake damper motor 230, normally closed intake damper motor relay contacts Rd or switch 270, and normally opened intake damper relay contacts Rc or switch 265.

In implementations, exhaust damper and intake damper can be non-powered and can operate as a "flop" damper that relies upon air pressure or gravity to open or close the dampers.

For example, intake and exhaust dampers can be Honeywell ARD power close-spring open round dampers manufactured by Honeywell in New Jersey. Other suitable conventional dampers can also be used. 24 v transformer 175 can be connected to or coupled with door switch 180 through contact 190 of door switch 180 and connected to or coupled with connector EAC-2 140 on Furnace Control Board 135.

Dehumidification control relay or switch 170 can be, for example, but not limited to, a double pole single throw-type relay or switch and can be connected to or coupled with normally opened intake fan motor relay contacts Rd or switch 220 and normally closed intake damper motor relay contacts Rd or switch 270. For example, when an instruction for dehumidification is received at Furnace Control Board 135, dehumidification control relay Rd or switch 170 becomes de-energized, which opens normally open intake fan motor relay contacts Rd or switch 220 and closes normally closed intake damper motor relay contacts Rd or switch 270.

When cold air relay coil Rc or switch 255 becomes energized, by switching thermostat switch to make contact with contact 204, both normally opened exhaust damper motor relay contacts Rc or switch 260 and normally opened intake damper motor relay contacts Rc or switch 265 close.

In normal power up and operation, door switch 180 and power switch (not shown) are closed and on. Outdoor humidistat 195 is closed, low temperature limit on thermostat 200 is closed, dehumidification control relay Rd or switch 170 is energized, cold air relay Rc or switch 255 is not energized, normally open intake damper motor 230 is open and normally closed intake damper motor relay contacts Rd or switch 270 are open, normally open exhaust damper motor 235 is open and normally open exhaust damper motor relay contacts Rc or switch 260 and normally open intake damper motor relay contacts Rc or switch 265 are open, intake fan motor 215 is on and normally open intake fan motor relay contacts Rd or switch 220 are closed, and exhaust fan motor 210 is on.

In cold outside air conditions, door switch 180 and power switch (not shown) are closed and on. Outdoor humidistat 195 is closed, low temperature limit on outdoor thermostat 200 is open and energizing cold air relay Rc or switch 255, dehumidification control relay Rd or switch 170 is energized, normally open intake damper motor 230 is closed and normally open intake damper motor relay contacts Rc or switch 265 are closed, normally open exhaust damper motor 235 is closed and normally open exhaust damper motor relay contacts Rc or switch 260 are closed, intake fan motor 215 is off and low temperature limit on outdoor thermostat 200 is open, and exhaust fan motor 210 is off and low temperature limit on outdoor thermostat 200 is open.

In high indoor humidity conditions, door switch 180 and power switch (not shown) are closed and on. Outdoor humidistat 195 is closed, low temperature limit on outdoor thermostat 200 is closed, dehumidification control relay Rd or switch 170 is not energized, cold air relay Rc or switch 255 is not energized, normally open intake damper motor 230 is closed and normally closed intake damper motor relay contacts Rd or switch 270 are closed, normally open exhaust damper motor 235 is opened and normally open exhaust damper motor relay contacts Rc or switch 260 are open, intake fan motor 215 is off and normally open intake fan motor relay contacts Rd or switch 220 are open, and exhaust fan motor 210 is on.

In high outdoor humidity conditions, door switch 180 and power switch (not shown) are closed and on. Outdoor humidistat 195 is open and energizing Rc relay or switch 255, low temperature limit on outdoor thermostat 200 is closed, dehumidification control relay Rd or switch 170 is energized, or is de-energized when indoor humidity is at or above absolute or relative humidity preset setpoint, as it operates independent from the outdoor humidistat 195, cold air relay Rc or switch 255 is energized, normally open intake damper motor 230 is closed and normally open intake damper motor relay contacts Rc or switch 265 are closed, normally open exhaust damper motor 235 is closed and normally open exhaust damper motor relay contacts Rc or switch 260 are closed, intake fan motor 215 is off, and exhaust fan motor 210 is off.

Figure 4:
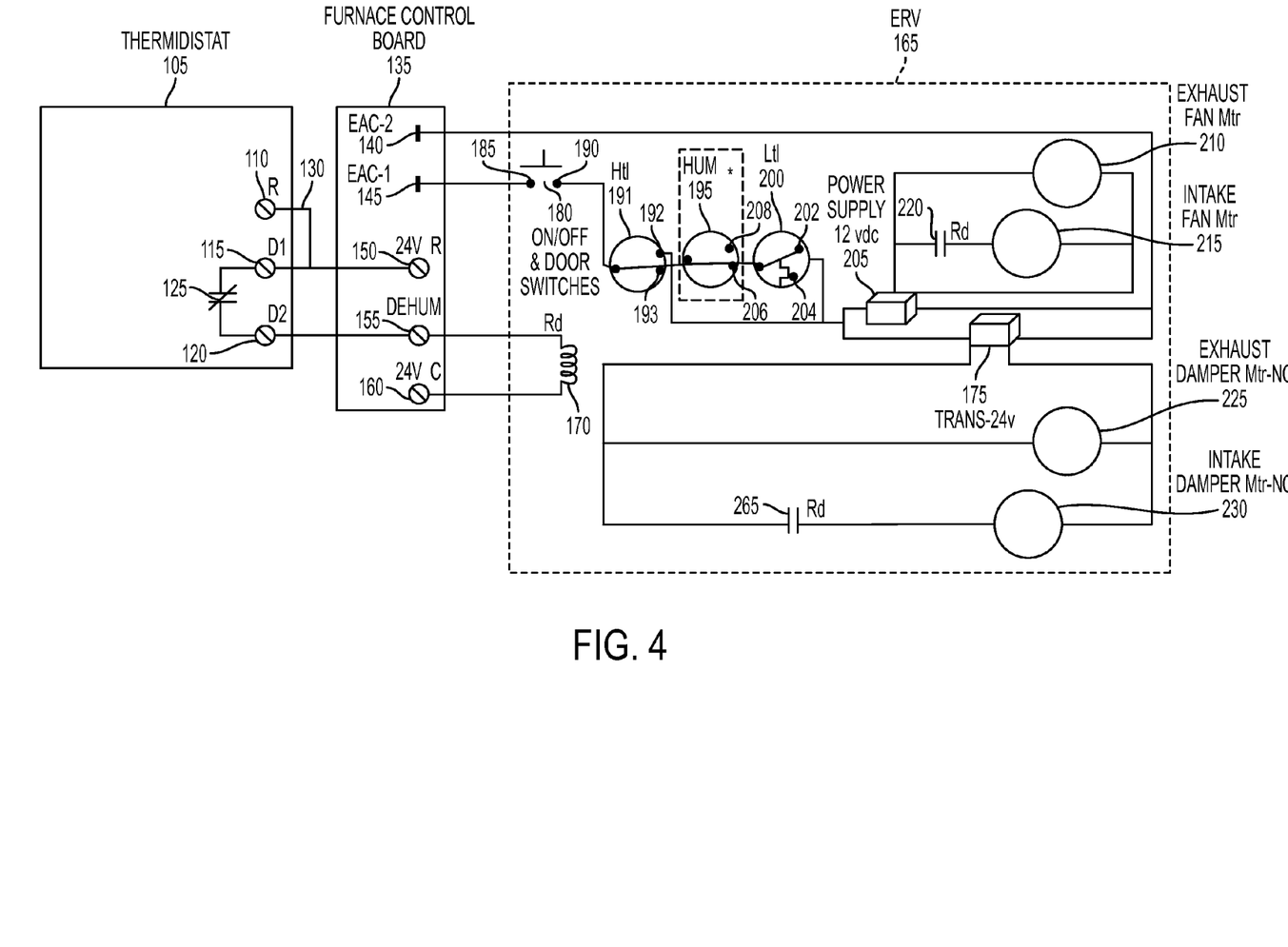
FIG. 4 shows another example of an implementation of a ERV control scheme in accordance with aspects of the present disclosure.

FIG. 4 shows another example implementation of an ERV that can use 12 VDC fan motors and 24 VAC normally closed damper. ERV 165 can comprise similar components as those described above in relation to FIGS. 2 and 3 including door switch 180, outdoor humidistat 195, and outdoor thermostat 200, fans (including motors), and dampers. Furnace Control Board 135 can be further connected to or coupled with ERV 165 by connecting or coupling EAC-2 140 to transformer 175 and connecting or coupling EAC-1 145 to door switch 180. When a door to ERV 165 is closed, door switch 180 is in the closed position and power is supplied to the ERV 165 by Furnace Control Board 135. For example, transformer 175 can be a 24 v transformer. For example, door switch 180 can be a push to make switch that is in a normally open (off) state when the button of the switch is released and allows electricity to flow between Furnace Control Board 135 and ERV 165 when the button is depressed allowing the two contacts (contact 185 and 190) to be in contact.

Contact 190 of door switch 180 can be can be optionally connected to or coupled with outdoor humidistat 195. If ERV 165 comprises humidistat 195, then humidistat 195 can be connected to or coupled with thermostat switch 200. If ERV 165 does not comprise humidistat 195, then contact of 190 of door switch 180 can be connected to or coupled with thermostat switch 200. In this implementation, when the ERV control box 165 does not comprise humidistat 195, dehumidification control relay or switch 170 can be used to regulate indoor humidity levels in conditions, such as, summer where the outdoor temperature and humidity can be high. For example, outdoor thermostat 200 can be a KLIXON 3NT thermostat, which is an automatic reset thermostat and sold by Sensata Technologies in Brazil. Other suitable conventional thermostat switches can also be used. Outdoor thermostat can include a switch can operate as a low temperature limit cutoff that deactivates the switch if the temperature goes below a predetermined set point temperature. Outdoor thermostat 200 can be connected to or coupled with power supply 205, for example, but not limited to, a 12 vdc power supply, which is then connected to or coupled with transformer 175.

Outdoor thermostat 200 can be connected to or coupled with exhaust fan motor 210, intake fan motor 215, intake fan motor relay or switch 220, exhaust damper motor 235, intake damper motor 230, and intake damper motor relay or switch 235 by way of power supply 205. In implementations, exhaust damper and intake damper can be non-powered and can operate as a "flop" damper that relies upon air pressure or gravity to open or close the dampers. The exhaust and intake damper can be for example, but limited to, a Honeywell ARD power open-spring close manufactured by Honeywell in New Jersey. Other suitable conventional dampers can also be used. In normal power up and operation, intake fan motor relay or switch 220 is in the closed position, which causes intake fan motor 215 to be activated and outdoor humidistat 195 and outdoor thermostat 200 are normally in a closed position.

When the outside temperature is at or below the predetermined set point temperature, outdoor humidistat 195 is closed, outdoor thermostat 200 is open, and intake fan motor relay or switch 220 is closed, which causes power to be cut off to ERV 165, which shuts down exhaust fan motor 210 and intake fan motor 215, and dehumidification control relay or switch 170 is energized. When the outside temperature is at the predetermined set point temperature, intake fan motor relay or switch 220 can be operable to be in either a closed or opened position depending on the desired use.

When the indoor humidity is determined to be high, outdoor humidistat 195 is closed, outdoor thermostat 200 is closed, dehumidification control relay or switch 170 is not energized, normally closed intake damper motor 230 remains closed, and the normally opened intake fan motor relay or switch contacts 220 and normally opened intake damper motor relay or switch contacts 265 remain opened. When the outdoor humidity is determined to be high, which can cause indoor humidity level to rise, outdoor humidistat 195 is opened, which causes power to be shut off to ERV Control Box 165, outdoor thermostat 200 is closed, dehumidification control relay or switch 170 is not energized, normally closed intake damper motor 230 remains closed, and the normally opened intake fan motor relay or switch contacts 220 and normally opened intake damper motor relay contacts 265 are opened.

In normal power up and operation, door switch 180 and power switch (not shown) are closed and on. Outdoor humidistat 195 is closed, low temperature limit on outdoor thermostat 200 is closed, dehumidification control relay Rd or switch 170 is energized, normally closed intake damper motor 230 is open and normally open intake damper motor relay contacts Rd or switch 265 are closed, exhaust damper 225, which is a 'flop damper' (no motor) is open, intake fan motor 215 is on and normally open intake fan motor relay contacts Rd or switch 220 are closed, and exhaust fan motor 210 is on.

In cold outside air conditions, door switch 180 and power switch (not shown) are closed and on. Outdoor humidistat 195 is closed, low temperature limit on thermostat switch 200 is open, which shuts ERV off, dehumidification control relay Rd or switch 170 is energized, normally closed intake damper motor 230 is closed since ERV is off, exhaust damper 225, which is a 'flop damper' (no motor) is closed and exhaust fan motor 210 is off, intake fan motor 215 is off since ERV is off, and exhaust fan motor 210 is off and low temperature limit on outdoor thermostat 200 is open.

In high indoor humidity conditions, door switch 180 and power switch (not shown) are closed and on. Outdoor humidistat 195 is closed, low temperature limit on outdoor thermostat 200 is closed, dehumidification control relay Rd or switch 170 is not energized, normally closed intake damper motor 230 is closed and normally open intake damper motor relay contacts Rd or switch 235 are open, exhaust damper 225, which is a 'flop damper' (no motor) is open, intake fan motor 215 is off and normally open intake fan motor relay contacts Rd or switch 220 are open, and exhaust fan motor 210 is on.

In high outdoor humidity conditions (causing indoor humidity levels to rise), door switch 180 and power switch (not shown) are closed and on. Outdoor humidistat 195 is open, which shuts ERV off, low temperature limit on thermostat switch 200 is closed, dehumidification control relay Rd or switch 170 is energized, or is de-energized when indoor humidity is at or above a preset indoor absolute or relative humidity setpoint, as it operates independent from the outdoor humidistat 195, normally closed intake damper motor 230 is closed and normally open intake damper motor relay contacts Rd or switch 265 are open, exhaust damper 225, which is a 'flop damper' (no motor) is closed and exhaust fan motor 210 is off, intake fan motor 215 is off since ERV is off, and exhaust fan motor 210 is off since high outdoor humidity as detected on outdoor humidistat 195 is open.

The control circuit shown in FIG. 4 utilizes normally closed dampers (intake and exhaust) 230 and 235 and as a result does not require relay Rc or switch 255, as shown and used in the arrangements of FIGS. 2 and 3, to close them. Thus, the power consumption of the arrangement of FIG. 4 will tend to be higher because dampers (intake and exhaust) 230 and 235 must be energized when open. In some implementations, the normally closed (NC) outside air intake damper of the embodiment of FIG. 4 can be a normally opened (NO) outside air intake damper.

Figure 5:
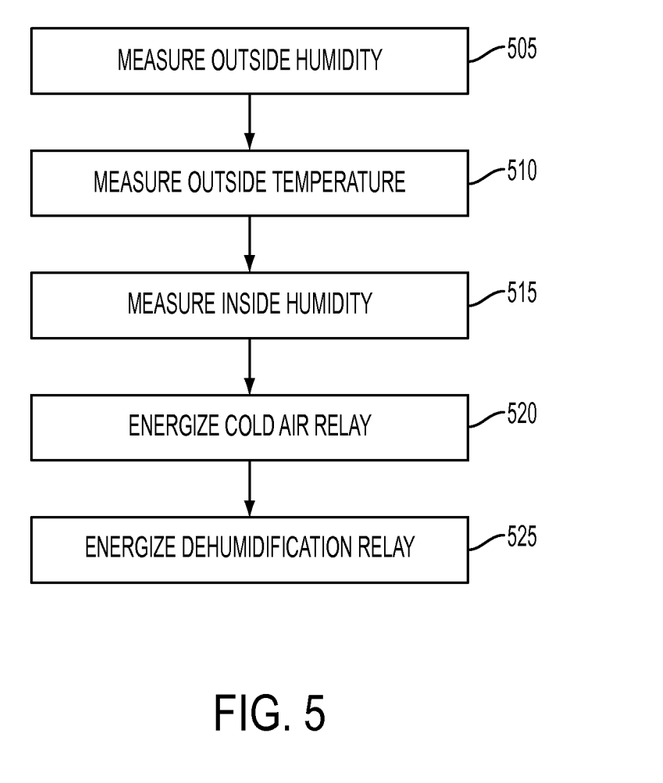
FIG. 5 shows an example process for ERV control in accordance with aspects of the present disclosure.

FIG. 5 shows an example process for ERV control in accordance with aspects of the present disclosure. The method for energy recovery ventilator control can begin at 505 where an outside humidity sensor can be provided and be operable to measure an outside absolute or relative humidity level. At 510, an outside intake air temperature sensor can be provided an operable to measure an outside air temperature as the outside air enters an intake air duct. In some aspects, the outside humidity sensor and be coupled with or connected to outside intake air temperature sensor using one or more switches. At 515, inside humidity can be measured by an inside humidity sensor.

At 520, a dehumidification control relay or switch can be provided and can be operable to be coupled with and powered by the heating and cooling system and that is operable to be coupled with an intake fan motor through an intake fan motor relay or switch contact and an intake damper motor through a first intake damper motor relay or switch contact. The dehumidification control relay or switch can be energized if the inside absolute or relative humidity level as measured by the inside humidity sensor is above a predetermined threshold level. For example, the predetermined humidity threshold level can be set or reset by a user of the ventilator system or can be manufactured with a preset level. For example, the threshold level can be between about 50% and about 60% relative humidity. Other absolute or relative humidity ranges can also be used.

At 525, a cold air relay or switch can be provided and can be operable to be coupled with and powered by the coupling of the outside humidity sensor and coupled with the outside intake air temperature sensor and operable to be coupled with an exhaust damper motor through an exhaust damper motor relay or switch contact and the intake damper motor through a second intake damper motor relay or switch contact. The cold air relay or switch can be energized if the outside air temperature as measured by the outside intake air temperature sensor is below a predetermined temperature threshold level. For example, the predetermined temperature threshold level can be set or reset by a user of the ventilator system or can be manufactured with a preset level. For example, the temperature threshold level can be between about 15 degrees F. and 35 degrees F. Other temperature or temperature ranges can also be used.

Figure 6:
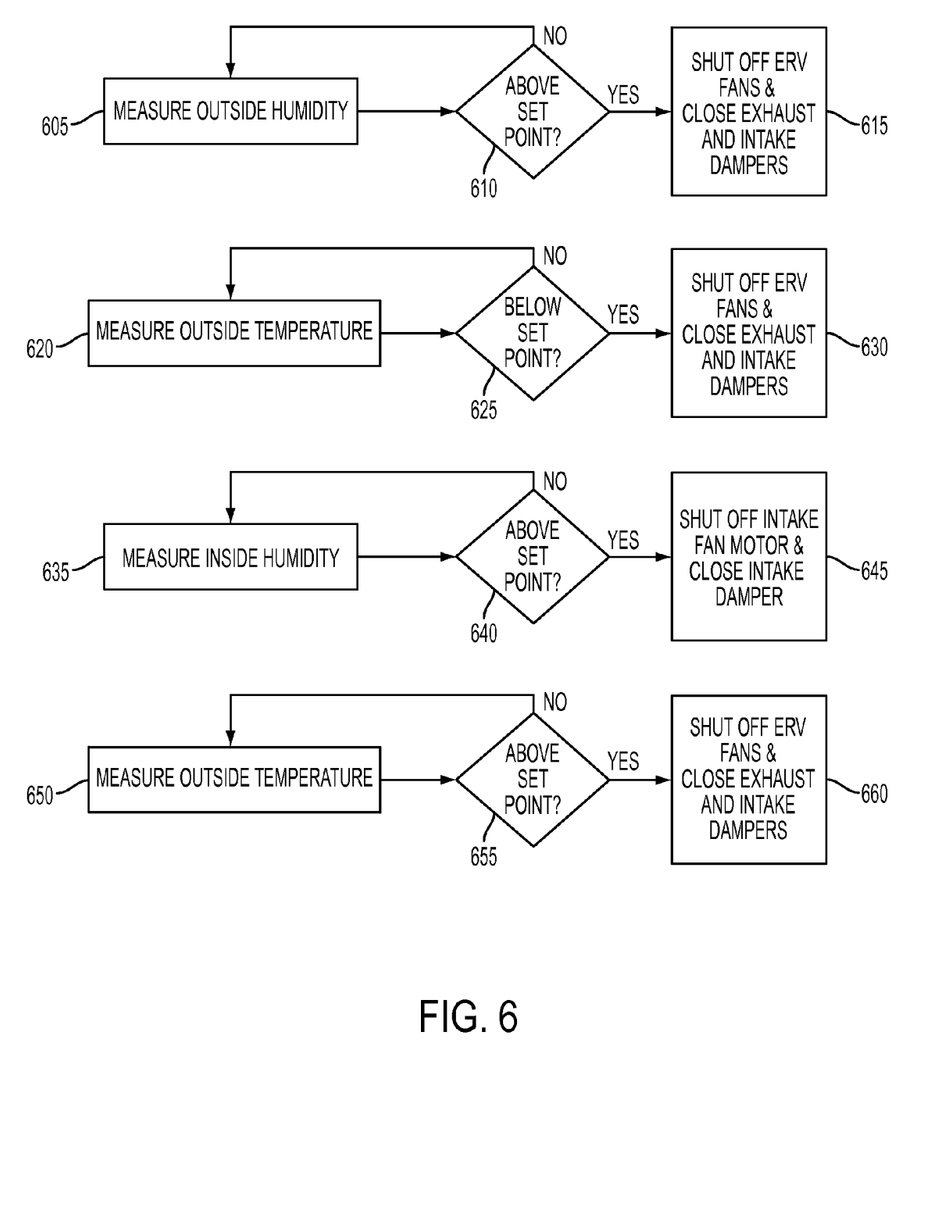
FIG. 6 shows example flow charts for an operational process in accordance with aspects of the present disclosure.

FIG. 6 shows example flow charts for an operational process in accordance with aspects of the present disclosure. In this process, the ERV is powered from furnace EAC terminals and the ERV (with switch on and door closed) is running anytime the furnace blower is running. The processes and measurements at 605, 620, and 635 below occur concurrently. At 605, an outside humidity measurement is made by outdoor humidistat 195. If the outside humidity is above an outside humidity setpoint at 610, then a control signal can be sent at 615 to shut off the ERV intake and exhaust fans 210 and 215 and energize relay Rc or switch 255 to close exhaust dampers 235 and intake damper 230. If the outside humidity is not above the setpoint, then no action is taken.

At 620, an outside temperature measurement is made by temperature sensor 200. If the outside temperature is below the temperature setpoint at 625, then a control signal can be sent, at 630, to shut off the ERV intake and exhaust fans 210 and 215 and energize relay Rc or switch 255 to close exhaust damper 235 and intake damper 230. If the outside temperature is not below the setpoint, then no action is taken.

At 635, an inside humidity measurement is made by humidity sensor 105. If the inside humidity is above the inside humidity setpoint at 640, then a control signal can be sent, at 645, to de-energize relay Rd or switch 170 to shut off intake fan motor 215 and close intake damper 230. If the inside humidity is not above the setpoint, then no action is taken.

At 650, an outside temperature measurement is made by outside high temperature switch 191. If the outside temperature is above the outside temperature setpoint at 655, then a control signal can be sent, at 660, to shut off the ERV fans (turn off exhaust fan motor 210 and intake fan motor 215) and energize relay Rc or switch 255 to close exhaust damper 235 and intake damper 230.

The interval for measurement of outside humidity, outside low temperature, inside humidity, and outside high temperature at 605, 620, 635, and 650, respectively, can be set so that measurements are taken at the same or at different times and the intervals can be set so that measurements can be taken continuously or separated by a predetermined time interval.

In implementations, the temperature and humidity sensors can either be electromechanical devices (thermostat or humidistat) or sensors that are wired to a logic circuit, which would do the comparing at 610, 625, 640, and 655.

The technical effects and benefits of embodiments relate to an ERV for use with a heating or cooling system and include a fresh air intake duct and an exhaust air duct. An outside air stream enters the ERV through air intake duct while stale conditioned air from an interior conditioned air space is exhausted through an exhaust air duct. The ERV also includes a heat exchange device for recovering energy from the stale conditioned air. In an embodiment, the ERV may be electrically wired directly, via a two-wire line, to the heating and cooling system in order to energize the ERV. Also, the ERV may be connected to a furnace/fan coil controller of the heating and cooling system in order to control operation of the ERV without utilizing an additional dedicated controller for ERV control and operation.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An energy recovery ventilator operable to be energized by electrical connection to a heating and cooling system in fluid communication with each of an intake air duct and an exhaust air duct, the control system comprising:

a humidity sensor operable to detect an outside humidity level and including a switch that is operable to be in a first state when the outside humidity is at a preset humidity level and a second state when the outside humidity level is lower than the preset humidity level;

an air temperature sensor operable to detect an outside air temperature and including a switch that is operable to be in a first state when the outside air temperature is at a preset outside temperature level and a second state when the outside air temperature is higher than the preset outside air temperature level;

an exhaust fan motor;

an intake fan motor operable to be in electrical communication with an intake fan motor switch contact;

an exhaust damper motor operable to be in electrical communication with an exhaust damper motor switch contact and operable to open and close an exhaust damper;

an intake damper motor operable to be in electrical communication with a first intake damper switch contact and a second intake damper switch contact and operable to open and close an intake damper;

a dehumidification control switch in electrical communication with the intake fan motor through the intake fan motor switch contact and the intake damper motor through the first intake damper motor switch contact; and a cold air switch operable to be in electrical communication with the humidity sensor, the air temperature sensor, the exhaust damper motor through the exhaust damper motor switch contact, and the intake damper motor through the second intake damper motor switch contact, wherein the cold air switch is operable to be energized if the outside humidity measured by the humidity sensor is at the preset humidity level or if the outside temperature measured by the air temperature sensor is at the preset outside air temperature level.

2. The energy recovery ventilator according to claim 1, wherein the dehumidification control switch is operable, when energized to provide power to the intake fan motor by closing the intake fan motor switch contact, while opening the first intake damper switch contact to shut off the intake damper motor.

3. The energy recovery ventilator according to claim 1, wherein the intake fan motor switch contacts are normally opened, the exhaust damper motor switch contacts are normally opened, the first intake damper motor switch contacts are normally opened, and the second intake damper motor switch contacts are normally closed.

4. The energy recovery ventilator according to claim 1, wherein the intake fan motor switch contacts are normally opened, the exhaust damper motor switch contacts are normally opened, the first intake damper motor switch contacts are normally closed, and the second intake damper motor switch contacts are normally opened.

5. The energy recovery ventilator according to claim 1, wherein if the humidity sensor detects that the outside humidity is at least about 85%, then the humidity sensor is operable to energize the cold air switch to disable current flow to the exhaust fan motor and the intake fan motor; close the exhaust damper by disabling current flow to the exhaust damper motor; and close the intake damper by disabling current flow to the intake damper motor.

6. The energy recovery ventilator according to claim 1, further comprising a transformer and a power supply, wherein both the transformer and the power supply are in electrical communication with the heating and cooling system and are operable to provide a reduced operating voltage to the exhaust fan motor and the intake fan motor.

* * * * *